Patented Apr. 18, 1944

2,346,793

UNITED STATES PATENT OFFICE 2,346,793

DERIVATIVE OF ROSIN AND ROSIN COMPOUNDS

Emma D. Schultz, New London, Conn., and William E. Shaefer, Kennett Square, Pa., assignors to Hercules Powder Company, Wilmington, Del., a corporation of Delaware No Drawing. Application October 9, 1941, Serial No. 414,276

22 Claims. (Cl. 260—100)

This invention relates to a method for accomplishing the substantially complete saturation of rosin and rosin derivatives with hydrogen and to the products formed thereby.

The prior art contains various references to hydrogenated rosins and hydrogenated rosin compounds. For example, U. S. patent to Ellis No. 1,249,050, granted December 4, 1917; U. S. patent to Brooks No. 1,167,264, granted January 4, 1916; and U. S. patent to Humphrey No. 2,113,808, granted April 12, 1938, disclose and claim hydrogenated rosins of varying degrees of hydrogen saturation. None of these products, however, are substantially completely saturated with hydrogen. The prior art, as indicated by the cited references, points out the difficulty, and heretofore the impossibility of obtaining, a substantially completely saturated rosin. The reason for this has been attributed to the fact that the second double bond of the rosin acids contained in rosin puts up a stiff resistance to hydrogenation. Moreover, what has been considered to be complete saturation in the prior art is not, in fact, complete saturation. It has been assumed that only the rosin acids in the rosin being hydrogenated were affected by the reaction and that consequently all the hydrogen added directly to the rosin acids, leaving the neutral bodies or non-acidic components unchanged. This, however, is not the case.

It is accordingly an object of this invention to provide rosin and rosin derivatives which are substantially completely saturated with hydrogen; it is also an object to provide a method for the production of these substantially completely saturated materials.

Other objects of the invention will become apparent upon an understanding of the processes to be described and the illustrative embodiments thereof.

In accordance with this invention, it has been found that when rosin, dissolved in a suitable inert solvent, is contacted with hydrogen in the presence of a platinum oxide catalyst, prepared by the fusion of a platinum compound and an alkali metal nitrate, for a minimum period of contact of between about 1 hour and about 4 hours, utilizing a catalyst to rosin ratio between about 0.2 and about 1.5, there is obtained a product which is distinctly different from the hydrogenated rosins of the prior art. This new product will be found to have absorbed at least 1.22% hydrogen on the basis of the unhydrogenated rosin. In general, it has been found that this new product will show a hydrogen absorption based on the original unsaturated rosin of between 1.22% and 1.66% or even higher. The product will, furthermore, be substantially completely resistant to oxidation and subsequent decomposition. Hereinafter, in this specification the term "substantially completely hydrogenated rosin" will be employed to denote this new type of hydrogenated rosin having absorbed at least 1.22% hydrogen on the basis of the unhydrogenated rosin. A "substantially completely hydrogenated rosin compound" will denote a rosin compound having absorbed at least 1.22% hydrogen on the basis of the rosin equivalent of the unhydrogenated rosin compound. Thus, for example, ester gum may be made from rosins having various acid numbers and correspondingly different neutral body contents. Any ester gum, therefore, has a rosin component, and the amount of rosin required to make any such ester gum can be calculated. This corresponding amount of rosin will be considered herein to be the rosin equivalent of the particular compound under consideration.

As a prelude to the disclosure of the more specific processes of this invention, it is felt desirable to give some consideration to the manner in which the hydrogen absorption of rosin has heretofore been reported. In the Humphrey patent, hereinbefore cited, the extent of hydrogenation is expressed as the percentage of the total possible saturation of the two double bonds in the rosin acids which are present in the rosin before hydrogenation (rosin acid basis). Thus, the percentage saturation is arrived at by multiplying by 100 the ratio of hydrogen actually absorbed to the theoretical amount of hydrogen which could be absorbed on the basis of the rosin acids present. This procedure involves two assumptions (1) that only the rosin acids of the rosin are hydrogenated and (2) that the acidic portion of the rosin has an average molecular weight of 302 as has abietic acid. The first of these assumptions was made in the absence of any information to the contrary at the time. However, it is now known that the non-acidic portion of rosin actually absorbs hydrogen at a higher rate and to a greater extent than the acidic portion. To avoid this incorrect assumption, the products of the present invention will be described by the percentage hydrogen absorbed. The conversion of the extent of hydrogenation from one basis to the other may be accomplished as follows:

$$C = 0.01333 A \frac{\text{Acid number of rosin}}{185.5}$$

Where $C$ = per cent hydrogen absorbed on hydrogenation.

$A$ = per cent saturation on "rosin acid basis."

$185.5$ = acid number of pure rosin acid having a molecular weight of 302.4.

$0.01333$ = weight of hydrogen required to saturate 1 gram of rosin acid having a molecular weight of 302.4.

In accordance with the invention, any platinum oxide catalyst may be employed which has been prepared by the fusion of a platinum compound with an alkali metal nitrate at an elevated temperature. This fundamental reaction is disclosed in articles by Voorhees and Adams, J. A. C. S., 44, 1397 (1922) and by Adams and Shriner, J. A. C. S., 45, 2171 (1923). The platinum oxide may be in supported or unsupported form. If supported, desirable support materials include kieselguhr, quartz, alumina, beryllia, zirconia, etc. In particular, a suitable supported platinum oxide may be prepared in accordance with the process described in U. S. Patent 2,207,868, granted July 16, 1940, to R. W. Martin. The particular platinum oxide catalyst employed may be reduced to metallic platinum in an atmosphere of hydrogen prior to its use, or it may be used without prior reduction.

Any inert organic solvent may be employed for the rosin. Thus, for example, an alcohol, such as, ethyl, methyl, propyl, isopropyl, butyl alcohol, etc.; an ether, such as, diethyl ether, methyl ethyl ether, diisopropyl ether, dibutyl ether, etc.; an ester, such as, ethyl acetate, isopropyl acetate, propyl acetate, ethyl propionate, etc.; an organic acid, such as, acetic, propionic, butyric acid, etc.; a hydrocarbon, such as, hexane, heptane, octane, cyclohexane, methyl cyclohexane, petroleum ether, petroleum naphtha, mineral spirits, gasoline, etc. may be employed. Although any of the aforesaid solvents, or a mixture of several, may be employed in the process, it is preferred that the solvent employed be one which contains an activating acid. The activating acid may be any organic or inorganic acid, such as, for example, acetic, butyric, propionic, monochloracetic, dichloracetic, trichloracetic, p-toluene sulfonic, hydrochloric, phosphoric, sulfuric, etc. Where an organic acid, such as, acetic acid is used as the solvent and it is desired to employ an activating acid in conjunction therewith, some acid other than the one employed as solvent will be employed, for example, phosphoric acid. The amount of activating acid used may be widely varied, and for example, may be within the range of from 0.1 to 150% of the solvent by weight. The ratio of rosin to solvent employed is not critical and may, for example, vary from about 0.01 to the limit of solubility of the saturated product in the solvent employed.

In carrying out the hydrogenation, the catalyst to rosin ratio employed is highly important, and the range within which it may fall is critical. Thus, it has been found that a ratio between about 0.2 and about 1.5 may be employed with the preferred range being between 0.3 and 0.75. By catalyst to rosin ratio, there is meant the ratio of platinum oxide to rosin and not the ratio of the supported catalyst, if one has been used, to the rosin. When a rosin compound is being hydrogenated in accordance with the processes described herein, it will be required that a catalyst to rosin equivalent ratio be utilized which is within the aforesaid ranges.

The period of contact of the rosin with the catalyst is also critical, however, the critical contact period is variable and depends upon the particular catalyst to rosin ratio being employed. Thus, utilizing a catalyst to rosin ratio of 0.2, it has been found that a minimum contact period of about 4.0 hours must be employed to secure a substantially completely hydrogenated rosin. When a catalyst to rosin ratio from 0.7 to 1.5 is employed, it is necessary to employ a minimum contact period of about 1.0 hour to obtain a substantially completely hydrogenated product. When a catalyst to rosin ratio between 0.2 and 0.7 is employed the minimum contact period required will vary between about 1.0 hour and about 4.0 hours. Hence, the minimum period of contact of the rosin with the catalyst, in accordance with the invention, may vary between about 1.0 hour and about 4.0 hours. Preferably, however, a period of contact between about 4.0 and about 20.0 hours will be employed.

In accordance with the invention, the conditions of temperature and pressure may be widely varied, it being understood that the invention is not dependent upon the use of any particular temperature or pressure. As illustrative, the temperature used may be between 10° C. and 60° C., preferably, between 20° C. and 30° C., while the pressure used may be between 1 and 1000 atmospheres, preferably, atmospheric.

The substantially completely hydrogenated rosin of this invention may be isolated from the solvent by any desirable means, such as, steam distillation followed by vacuum distillation to remove the last traces of solvent. Prior to removal of the solvent, however, the catalyst will be removed by some method, such as, filtering or settling.

It will be realized that the present invention is concerned with the hydrogenation of rosins. These rosins may be of the crude or refined types, of color grades ranging from, for example, FF to WW. Both wood and gum rosin, as desired, may be employed. However, the rosins employed will be those commonly known as such and which contain in addition to rosin acids a non-acidic or neutral portion. This non-acidic or neutral portion may be present in amounts varying between about 8.7% and about 24.4% by weight. These rosins will have acid numbers varying between about 140 and about 170.

The refined types of rosin which may be employed in accordance with the invention are those which have been distilled under reduced pressure; distilled under reduced pressure with the injection of an inert gas; extracted with color body solvents; treated with various adsorbents for the removal of various impurities, as color bodies, visible and latent, oxidized resin acids, etc. Furthermore, the rosin may be subjected to a preliminary heat-treatment before it is subjected to hydrogenation. If desired, the heat-treatment step may follow the treatment with hydrogen, as may the other refining treatments given hereinabove. Desirably, the heat-treatment will be carried out in an inert atmosphere, as for example, carbon dioxide, nitrogen, etc.

In general, the invention is applicable to any rosin of the type aforesaid or to any compound prepared therefrom. Thus, for example, the monohydric alcohol esters of rosin, such as, the methyl, ethyl, a propyl, a butyl, an amyl, tetrahydrofurfuryl, borneol, fenchyl, cyclohexanol, stearol, lauryl, etc., esters may be employed, also the polyhydric alcohol esters of rosin, such as, ethylene glycol, propylene glycol, butylene glycol, glycerol, pentaerythritol, trimethylene glycol, diethylene glycol, triethylene glycol, etc. esters may be employed.

There follow several specific examples which illustrate particular embodiments of the processes of the invention. All parts, ratios and percentages in the specification and claims are by weight unless otherwise indicated.

Example 1

I wood rosin in the amount of 7.033 parts, having an acid number of 165, was dissolved in 104 parts of glacial acetic acid. 5.00 parts of a platinum oxide catalyst, prepared by the fusion of a platinum compound with sodium nitrate were added and the mixture agitated in an atmosphere of hydrogen for 4 hours at 25° C. and at atmospheric pressure. The catalyst was prepared in accordance with the method set forth in "Organic Syntheses," collective vol. I, p. 452 (1932). The solvent was then removed by reduced pressure distillation. The product was found to have absorbed hydrogen to the extent of 1.44% on the basis of the original rosin. This corresponded with a saturation of 121% of two double bonds on the "rosin acid basis" as heretofore described. The product had a refractive index of 1.5154 at 20° C.

Example 2

I gum rosin in the amount of 6.813 parts, having an acid number of 170, was dissolved in 104 parts of glacial acetic acid. 5.00 parts of a platinum oxide catalyst of the type used in Example 1 were added thereto. The mixture was agitated in an atmosphere of hydrogen for 11 hours at 26° C. and at atmospheric pressure. The solvent was removed by reduced pressure distillation to yield a product showing a hydrogen absorption of 1.29% based on the original rosin. This corresponds with a saturation of 105% of two double bonds on the "rosin acid basis" as heretofore described. The product had a refractive index of 1.5180 at 20° C.

Example 3

N wood rosin in the amount of 6.970 parts, having an acid number of 165.5, was dissolved in 104 parts of glacial acetic acid and 4.910 parts of a platinum oxide catalyst of the type used in Example 1 were added thereto. The mixture was shaken in an atmosphere of hydrogen for a period of 18 hours at 25° C. and at atmospheric pressure. The solvent was removed by reduced pressure distillation. The product was shown to have absorbed hydrogen to the extent of 1.46% on the basis of the original rosin. This corresponded with a saturation of 122.5% of two double bonds on the "rosin acid basis" as heretofore described. The product had a refractive index of 1.5152 at 20° C.

Example 4

The methyl ester of rosin in the amount of 6.525 parts was dissolved in 104 parts of glacial acetic acid. The rosin from which the ester was prepared had an acid number of 165. To the resulting solution there were added 4.995 parts of a platinum oxide catalyst of the type used in Example 1. The mixture was agitated in an atmosphere of hydrogen for a period of 21 hours at 27° C. and at atmospheric pressure. The solvent was removed by reduced pressure distillation. The product was shown to have absorbed 1.54% hydrogen on the basis of the methyl ester employed. The product had a refractive index of 1.5044 at 20° C.

Example 5

N wood rosin in the amount of 6.510 parts, having an acid number of 165, was dissolved in 104 parts of a solution formed by adding 20 parts of aqueous 35% hydrochloric acid to 1480 parts of ethyl alcohol. To the resulting solution were added 4.660 parts of a platinum oxide catalyst of the type used in Example 1 and the mixture was agitated with hydrogen for 16 hours at 24° C. and at atmospheric pressure. The solvent was removed by reduced pressure distillation. The product showed a 1.44% hydrogen absorption on the basis of the unhydrogenated rosin. This corresponded with a saturation of 121% of two double bonds on the "rosin acid basis" hereinbefore described. The product had a refractive index of 1.5155 at 20° C.

Example 6

N wood rosin in the amount of 7.145 parts, having an acid number of 165, was dissolved in 104 parts of glacial acetic acid and 19.91 parts of a platinum oxide catalyst supported on kieselguhr were added thereto. This catalyst was prepared by fusion of a platinum compound with sodium nitrate as in Example 1, only the platinum oxide was supported on particles of kieselguhr in accordance with U. S. Patent No. 2,207,868, granted to R. W. Martin. The actual amount of platinum present was 1.991 parts which corresponds with about 2.500 parts of platinum oxide. The mixture was agitated in the presence of hydrogen for 20 hours at 25° C. and at atmospheric pressure. The solvent was removed by reduced pressure distillation to yield a hydrogenated product showing a hydrogen absorption of 1.48% on the basis of the unhydrogenated rosin. This corresponds with a saturation of 125% of two double bonds on the "rosin acid basis" as heretofore described. The product had a refractive index of 1.5154 at 20° C.

Example 7

N wood rosin in the amount of 5.995 parts, having an acid number of 165, was dissolved in 105 parts of a solution formed by adding 34 parts of aqueous 85% phosphoric acid to 1019 parts of glacial acetic acid. To the rosin solution were added 4.220 parts of a platinum oxide catalyst, and the resulting mixture was agitated in an atmosphere of hydrogen for a period of 17 hours at room temperature and at atmospheric pressure. The solvent was removed by reduced pressure distillation to yield a product showing a hydrogen absorption of 1.40% on the basis of the unhydrogenated rosin. This corresponded with a saturation of 118% of two double bonds on the "rosin acid basis" as hereinbefore described. The hydrogenated rosin of this example had a refractive index of 1.5160 at 20° C.

Example 8

N wood rosin in the amount of 6.285 parts, having an acid number of 165, was dissolved in 92 parts of a solution consisting of 600 parts of glacial acetic acid and 400 parts of isopropyl ether, and 4.295 parts of a platinum oxide catalyst of the type used in Example 1 were added thereto. The resulting mixture was agitated in the presence of hydrogen for 15½ hours at 28° C. and at atmospheric pressure. The product showed a hydrogen absorption of 1.36% on the basis of the unhydrogenated rosin, which corresponded to a saturation of 114% of two double bonds on the "rosin acid basis" as hereinbefore described. The refractive index of the product was 1.5167 at 20° C.

Example 9

FF wood rosin in the amount of 6.000 parts, having an acid number of 154, was dissolved in 104 parts of glacial acetic acid and 4.190 parts of a platinum oxide catalyst of the type used in Example 1 was added thereto. The mixture was shaken in an atmosphere of hydrogen for a period of 17 hours at about 27° C. and at atmospheric pressure. The product was shown to have absorbed hydrogen to the extent of 1.66% on the basis of the original rosin. This corresponded with a saturation of 150% of two double bonds on the "rosin acid basis" as heretofore described. The product had a refractive index of 1.5184 at 20° C.

The hydrogenated rosins prepared in accordance with this invention are characterized by the fact that they are substantially completely resistant to oxidation. They are furthermore characterized by their having absorbed at least 1.22% and generally between 1.22% and 1.66% hydrogen on the basis of the original rosins before hydrogenation. The indices of refraction at 20° C. of these new hydrogenated rosins prepared in accordance with the present invention will be found to range between 1.5207 and 1.5148. Furthermore, the oxygen absorption values of the substantially completely saturated rosins will be less than 0.02% showing that the new products are substantially completely resistant to oxidation and subsequent decomposition. Heretofore, rosins having such remarkable characteristics have not been known. The result is that these new hydrogenated rosins have an extended scope of utility in the commercial arts.

The substantially completely saturated rosins may be esterified with monohydric and polyhydric alcohols. The improved rosins of this invention may also be used in gloss oils, in oil varnishes and in the making of soaps and sizes for paper.

What we claim and desire to protect by Letters Patent is:

1. The method of producing a substantially completely hydrogenated product which comprises subjecting a material selected from the group consisting of rosin and rosin compounds, dissolved in a suitable inert solvent therefor, to treatment with hydrogen, in the presence of a platinum oxide hydrogenation catalyst, at a temperature between about 10° C. and about 60° C., utilizing a ratio of platinum oxide to rosin equivalent of the material employed of between about 0.2 and about 1.5, until the material has a hydrogen absorption of at least 1.22% on the basis of the rosin equivalent of the unhydrogenated material.

2. The method of producing a substantially completely hydrogenated rosin which comprises subjecting a rosin, dissolved in a suitable inert solvent therefor, to treatment with hydrogen, in the presence of a platinum oxide hydrogenation catalyst, at a temperature between about 10° C. and about 60° C., utilizing a platinum oxide to rosin ratio of between about 0.2 and about 1.5, until the rosin has a hydrogen absorption of at least 1.22% on the basis of the unhydrogenated rosin.

3. The method of producing a substantially completely hydrogenated rosin which comprises subjecting a rosin, dissolved in a suitable inert solvent therefor, to treatment with hydrogen, in the presence of a platinum oxide hydrogenation catalyst, at a temperature between about 10° C. and about 60° C., for a period between about 4 hours and about 20 hours, utilizing a platinum oxide to rosin ratio of between about 0.2 and about 1.5.

4. The method of producing a substantially completely hydrogenated rosin which comprises subjecting a rosin, dissolved in a suitable inert solvent therefor, to treatment with hydrogen, in the presence of a platinum oxide hydrogenation catalyst, at a temperature between about 10° C. and about 60° C., for a period between about 4 hours and about 20 hours, utilizing a platinum oxide to rosin ratio of between about 0.3 and about 0.75.

5. The method of producing a substantially completely hydrogenated rosin which comprises subjecting a rosin, dissolved in a suitable inert solvent therefor, to treatment with hydrogen, in the presence of a platinum oxide hydrogenation catalyst, for a period between about 4 hours and about 20 hours, at a temperature between about 10° C. and about 60° C., at a pressure between about 1 atmosphere and about 1000 atmospheres, utilizing a platinum oxide to rosin ratio of between about 0.3 and about 0.75.

6. The method of producing a substantially completely hydrogenated rosin which comprises subjecting a rosin, dissolved in a suitable inert solvent therefore, to treatment with hydrogen, in the presence of a platinum oxide hydrogenation catalyst, for a period between about 4 hours and about 20 hours, at a temperature between about 20° C. and about 30° C., at a pressure of about 1 atmosphere, utilizing a platinum oxide to rosin ratio of between about 0.3 and about 0.75.

7. The method of producing a substantially completely hydrogenated rosin which comprises subjecting a rosin, dissolved in acetic acid, to treatment with hydrogen, in the presence of a platinum oxide hydrogenation catalyst, for a period between about 4 hours and about 20 hours, at a temperature between about 20° C. and about 30° C., at a pressure of about 1 atmosphere, utilizing a platinum oxide to rosin ratio of between about 0.3 and about 0.75.

8. The method of producing a substantially completely hydrogenated rosin which comprises subjecting a rosin dissolved in a solvent consisting of glacial acetic acid and isopropyl ether, to treatment with hydrogen, in the presence of a platinum oxide hydrogenation catalyst, for a period between about 4 hours and about 20 hours, at a temperature between about 20° C. and about 30° C., at a pressure of about 1 atmosphere, while maintaining a platinum oxide to rosin ratio of between about 0.3 and about 0.75.

9. The method of producing a substantially completely hydrogenated rosin which comprises subjecting a rosin, dissolved in a suitable inert solvent which contains an activating acid as distinguished from the solvent, to treatment with hydrogen, in the presence of a platinum oxide hydrogenation catalyst, at a temperature between about 10° C. and about 60° C., utilizing a platinum oxide to rosin ratio of between about 0.2 and about 1.5, until the rosin has a hydrogen absorption of at least 1.22% on the basis of the unhydrogenated rosin.

10. The method of producing a substantially completely hydrogenated rosin which comprises subjecting a rosin, dissolved in a suitable inert solvent which contains an activating acid as distinguished from the solvent, to treatment with hydrogen, in the presence of a platinum oxide hydrogenation catalyst, at a temperature between about 10° C. and about 60° C., for a period between about 4 hours and about 20 hours, utilizing a platinum oxide to rosin ratio of between about 0.3 and about 0.75.

11. The method of producing a substantially completely hydrogenated rosin which comprises subjecting a rosin, dissolved in a suitable inert solvent which contains an activating acid as distinguished from the solvent, to treatment with hydrogen, in the presence of a platinum oxide hydrogenation catalyst, for a period between about 4 hours and about 20 hours, at a temperature between about 10° C. and about 60° C., at a pressure between about 1 atmosphere and about 1000 atmospheres, utilizing a platinum oxide to rosin ratio of between about 0.3 and about 0.75.

12. The method of producing a substantially completely hydrogenated rosin which comprises subjecting a rosin, dissolved in a suitable inert solvent which contains an activating acid as distinguished from the solvent, to treatment with hydrogen, in the presence of a platinum oxide hydrogenation catalyst, for a period between about 4 hours and about 20 hours, at a temperature between about 20° C. and about 30° C., at a pressure of about 1 atmosphere, utilizing a platinum oxide to rosin ratio of between about 0.3 and about 0.75.

13. The method of producing a substantially completely hydrogenated rosin which comprises subjecting a rosin, dissolved in acetic acid which contains phosphoric acid as an activating acid, to treatment with hydrogen, in the presence of a platinum oxide hydrogenation catalyst, for a period between about 4 hours and about 20 hours, at a temperature between about 20° C. and about 30° C. at a pressure of about 1 atmosphere, utilizing a platinum oxide to rosin ratio of between about 0.3 and about 0.75.

14. The method of producing a substantially completely hydrogenated rosin which comprises subjecting a rosin, dissolved in butyric acid which contains phosphoric acid as an activating acid, to treatment with hydrogen, in the presence of a platinum oxide hydrogenation catalyst, for a period between about 4 hours and about 20 hours, at a temperature between about 20° C. and about 30° C., at a pressure of about 1 atmosphere, utilizing a platinum oxide to rosin ratio of between about 0.3 and about 0.75.

15. A hydrogenated rosin material selected from the group consisting of hydrogenated rosin and hydrogenated rosin esters, characterized by being substantially completely saturated with hydrogen and having absorbed at least 1.22% hydrogen on the basis of the rosin equivalent of the unhydrogenated rosin material.

16. A hydrogenated rosin material selected from the group consisting of hydrogenated rosin and hydrogenated rosin esters, characterized by being substantially completely saturated with hydrogen and having absorbed between 1.22% and 1.66% hydrogen on the basis of the rosin equivalent of the unhydrogenated rosin material.

17. A hydrogenated rosin characterized by being substantially completely saturated with hydrogen and having absorbed between 1.22% and 1.66% hydrogen on the basis of the unhydrogenated rosin.

18. A hydrogenated rosin characterized by being substantially completely saturated with hydrogen, having absorbed between 1.22% and 1.66% hydrogen on the basis of the unhydrogenated rosin, and having a refractive index at 20° C. between about 1.5207 and about 1.5148.

19. A hydrogenated rosin characterized by being substantially completely saturated with hydrogen, having absorbed between 1.22% and 1.66% hydrogen on the basis of the unhydrogenated rosin, having a refractive index between about 1.5207 and about 1.5148, and having an oxygen absorption value of less than 0.02% based on the hydrogenated rosin upon exposure to oxygen at a pressure of 300 lbs./sq. in. and at 25° C. for a period of 160 hours.

20. A hydrogenated wood rosin characterized by being substantially completely saturated with hydrogen and having absorbed between 1.22% and 1.66% hydrogen on the basis of the unhydrogenated wood rosin.

21. A hydrogenated gum rosin characterized by being substantially completely saturated with hydrogen and having absorbed between 1.22% and 1.66% hydrogen on the basis of the unhydrogenated gum rosin.

22. A hydrogenated rosin characterized by being substantially completely resistant to oxidation and having absorbed between 1.22% and 1.66% hydrogen on the basis of the unhydrogenated rosin.

EMMA D. SCHULTZ.
WILLIAM E. SHAEFER.